United States Patent
Kerans et al.

(10) Patent No.: US 7,279,230 B1
(45) Date of Patent: Oct. 9, 2007

(54) HYBRID COMPOSITE MATERIALS

(75) Inventors: Ronald J. Kerans, Yellow Springs, OH (US); Triplicane A. Parthasarathy, Beavercreek, OH (US)

(73) Assignee: United States of America as represented by the Secretary of the Air Force, Washington, DC (US)

(*) Notice: Subject to any disclaimer, the term of this patent is extended or adjusted under 35 U.S.C. 154(b) by 128 days.

(21) Appl. No.: 10/784,311

(22) Filed: Feb. 23, 2004

(51) Int. Cl.
*B32B 5/14* (2006.01)
*B32B 5/16* (2006.01)
*B32B 7/02* (2006.01)
*B32B 15/14* (2006.01)

(52) U.S. Cl. ............. 428/610; 428/621; 428/614; 428/212; 428/293.1; 428/294.4; 428/539.5

(58) Field of Classification Search ........... 428/610, 428/621, 614, 212, 293.1, 294.4, 539.5
See application file for complete search history.

(56) References Cited

U.S. PATENT DOCUMENTS

| | | | |
|---|---|---|---|
| 5,354,528 A * | 10/1994 | Akiyama et al. | ............. 264/87 |
| 5,549,151 A * | 8/1996 | Yang | ............. 164/97 |
| 5,580,658 A * | 12/1996 | Maruyama et al. | ......... 428/408 |
| 6,037,066 A | 3/2000 | Kuwabara | |
| 6,251,815 B1 | 6/2001 | Parthasarathy et al. | |
| 6,254,974 B1 * | 7/2001 | Hanzawa et al. | ............ 428/212 |
| 6,322,897 B1 * | 11/2001 | Borchert et al. | ............ 428/469 |
| 6,986,940 B1 * | 1/2006 | Carper | .................... 428/292.1 |

FOREIGN PATENT DOCUMENTS

JP          04-298332          * 10/1992

\* cited by examiner

*Primary Examiner*—John J. Zimmerman
*Assistant Examiner*—Jason Savage
(74) *Attorney, Agent, or Firm*—Bart S. Hersko; Afmclo/Jaz

(57) ABSTRACT

A fiber-reinforced metal-ceramic composite material having a hot ceramic side and a cool metal side and a graded ceramic-metal zone therebetween, wherein the ceramic content of said composite ranges from 100% at said hot ceramic side to 0% at said cool metal side and the metal content of said composite ranges from 0% at said hot ceramic side to 100% at said cool metal side, and wherein said fiber reinforcement is graded by coefficient of thermal expansion from the hot ceramic side to the cool metal side.

6 Claims, 1 Drawing Sheet

HYBRID COMPOSITE MATERIALS

RIGHTS OF THE GOVERNMENT

The invention described herein may be manufactured and used by or for the Government of the United States for all governmental purposes without the payment of any royalty.

BACKGROUND OF THE INVENTION

The present invention relates to fiber-reinforced composites.

Conventional ceramic materials are used extensively as engineered materials and products. They are very hard materials with good thermal resistance and corrosion resistance. They tend, however, to incorporate defects during formation processes, which lead to strength faults under specified temperature and pressure conditions. These materials, while they are very hard, are also very brittle. This can result in splintering and cracking upon sudden or rapid loss in temperature, or upon impact with another material of high hardness. Fiber-reinforced ceramic composites offer significant improvements with respect to fracture resistance. They are well known and are important in the ceramic industry for high temperature engineering components, such as gas turbine and diesel engines where high temperature resistance are required. However there is a compromise in strength or load-bearing capacity.

In U.S. Pat. No. 6,251,815, issued Jun. 26, 2001 to Triplicane A. Parthasarathy and Ronald J. Kerans, we disclosed an improved fiber-reinforced ceramic composite material in which reinforcing fibers having different coefficients of thermal expansion were used in selected regions of the composite structure to reduce thermal gradient induced stresses. We have now found that the composite properties can be further enhanced by varying the matrix composition in selected regions of the composite.

To augment the load-bearing capacity, the composite has a metallic region within the matrix of the composite. This supplements the conventional ceramic materials to compensate for a deficiency in load-bearing capacity as well as thermal conductivity, which hinders use of ceramic materials for a specified purpose. Carefully selected metal components may cure one or several of these deficiencies. The resulting composite material will better withstand high temperature, and display less rigid and more ductile characteristics with less tendency to fracture when struck hard or cooled or heated rapidly. In addition, the ceramic regions are expected to be carefully varied for optimal properties.

Accordingly, it is an object of the present invention to provide a fiber-reinforced metal-ceramic composite material.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there is provided a fiber-reinforced metal-ceramic composite material having a hot ceramic side and a cool metal side and a graded ceramic-metal zone therebetween, wherein the ceramic content of said composite ranges from 100% at said hot ceramic side to 0% at said cool metal side and the metal content of said composite ranges from 0% at said hot ceramic side to 100% at said cool metal side, and wherein said fiber reinforcement is graded by coefficient of thermal expansion from the hot ceramic side to the cool metal side.

The fiber-reinforced metal-ceramic composite material can be fabricated using a slurry process as later described.

DETAILED DESCRIPTION OF THE INVENTION

Figure 1:
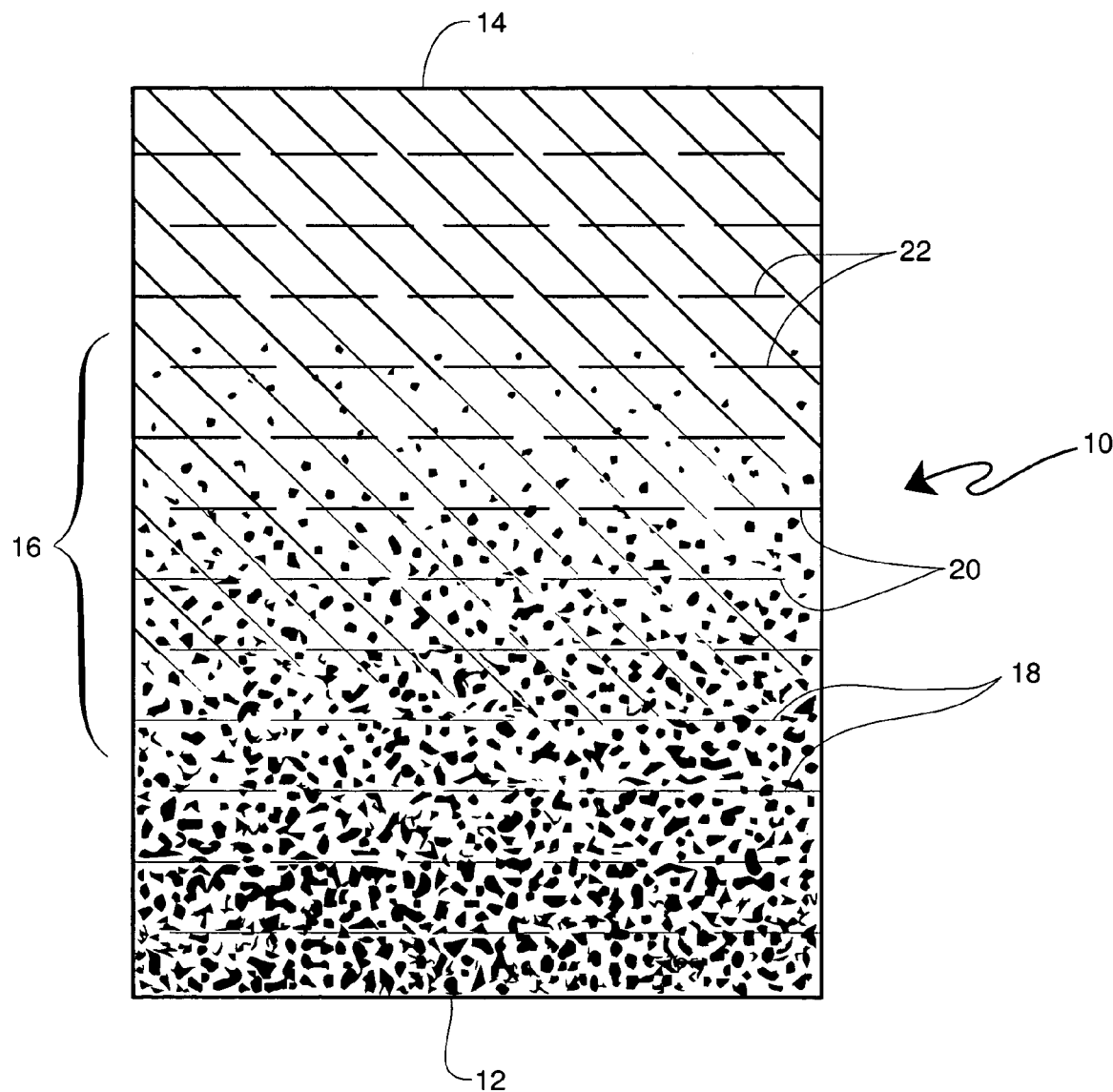
FIG. 1 is a cross-section illustrating the fiber-reinforced metal-ceramic composite material of this invention.

In the drawing, composite structure 10 has a hot ceramic side 12, a cool metal side 14 and a graded ceramic-metal zone 16 therebetween. Those skilled in the art will recognize that the terms hot and cool, as applied to the operating sides, are relative terms indicating that a temperature differential exists between the two sides and do not imply that the temperature is uniform within the region. Inasmuch as these structures are intended for use in high temperature environments, this temperature differential is on the order of 100° C. or greater. The ceramic side 12 is 100% ceramic; the metal side is 100% metal; the ceramic content of the graded ceramic-metal zone ranges from 100% at the hot side 12 to 0% at the cool side 14; and the metal content of the ceramic-metal zone ranges from 0% at the hot side 12 to 100% at the cool side 14. Composite structure 10 is reinforced with a plurality of fibers 18, 20 and 22. Fibers 18, 20 and 22 have different coefficients of thermal expansion, and their placement in the composite depends on the operating or use temperature of the composite.

The ceramic matrix material in the hot ceramic side can be an oxide or a mixture of oxides of a metallic or of a non-metallic element, for example, an oxide of aluminium, calcium, magnesium, silicon, chromium, hafnium, molybdenum, thorium, uranium, titanium or zirconium. The ceramic material may be a carbide of, for example, boron, chromium, hafnium, molybdenum, niobium, tantalum, thorium, titanium, tungsten, uranium, zirconium or vanadium. The ceramic material may be silicon carbide. The ceramic material may be a boride or a nitride, for example, a boride or a nitride of one or more of the elements hereinbefore referred to.

The metal matrix material in the cool metal side can be a nickel-base superalloy or titanium-based alloy compositions.

The graded ceramic-metal zones 16 can range from a mixture of about 90:10 (ceramic:metal) nearest the hot ceramic side 12 to about 10:90 nearest the cool metal side 14.

The fiber reinforcement can be silicon carbide, alumina-boria-silica, alumina, silica, alumina-silica, silicon carbide containing titanium, silicon nitride, silicon oxycarbonitride, alumina-zirconia and the like. The fibers in the metal regions may be the same or different from those in the ceramic regions.

In general, different fiber types should be placed in the composite matrix such that stresses arising from differences in their thermal expansivity are opposite the stresses imposed by differences in temperature during application. Hence, the fibers with the highest expansion will go in the region of the composite that is nearest in temperature to the Minimum-Stress (uniform) Temperature (MST). Minimum-Stress (uniform) Temperature is defined as the uniform temperature at which the constrained part (that is, fastened into place for use) will have the lowest internal stresses. Parts that are used below the MST will have the higher-expansion fibers in the hotter region and parts used above the MST will have the higher expansion fibers in the cooler region.

Thus, in one embodiment of the invention, when the use temperature is greater than the stress-free temperature, the fiber in the hot region may have a lower coefficient of thermal expansion than the fiber in the cool region. Accordingly, referring again to the drawing, fiber 18 in hot ceramic side 12 may have a lower coefficient of thermal expansion than fiber 22 in cool metal side 14, and fiber 20 may have a coefficient of thermal expansion between that of fiber 18 and fiber 22.

In another embodiment of the invention, when the use temperature is less than the stress-free temperature, the fiber in the hot region may have a higher coefficient of thermal expansion than the fiber in the cool region. Accordingly, referring again to the drawing, fiber 18 in hot ceramic side 12 may have a higher coefficient of thermal expansion than fiber 22 in cool metal side 14, and fiber 20 may have a coefficient of thermal expansion between that of fiber 18 and fiber 22.

The composite structure 10 shown in FIG. 1 can be fabricated by a slurry process using a vacuum filter apparatus to hasten settling of the various metal, metal-ceramic and ceramic zones. Using such an apparatus, a plurality of reinforcing fibers are jigged in a desired configuration to provide a fiber preform. The preform is then infiltrated with a slurry of a desired metal in a suitable liquid, such as water or methanol, to a desired depth. The preform is thereafter infiltrated with one or more slurry mixtures of metal and ceramic to desired depth. Finally, the preform is infiltrated with a slurry of a desired ceramic. The filter cake, with reinforcing fibers embedded therein, is removed from the vacuum filter apparatus and dried. The resulting material is fired under inert conditions to densify the metal and sinter the ceramic matrices. Alternatively, the composite structure can be fabricated using methods such as forced flow chemical vapor deposition, tape casting and sintering, dip coating of fibers or fiber preform, and the like.

Having thus described exemplary embodiments of the present invention, it should be noted by those skilled in the art that the disclosures herein are exemplary only and that alternatives, adaptations and modifications may be made within the scope of the present invention.

We claim:

1. A fiber-reinforced metal-ceramic composite material having a hot ceramic side and a cool metal side and a graded ceramic-metal zone therebetween, wherein the ceramic content of said composite ranges from 100% at said hot ceramic side to 0% at said cool metal side and the metal content of said composite ranges from 0% at said hot ceramic side to 100% at said cool metal side, and wherein said fiber reinforcement is graded by coefficient of thermal expansion from said hot ceramic side to said cool metal side to withstand a temperature differential of at or greater than 100° C. wherein said metal is thermally conductive.

2. The fiber-reinforced metal-ceramic composite material of claim 1 wherein the fiber in the hot region has a lower coefficient of thermal expansion than the fiber in the cool region.

3. The fiber-reinforced metal-ceramic composite material of claim 1 wherein the fiber in the hot region has a higher coefficient of thermal expansion than the fiber in the cool region.

4. A fiber-reinforced metal-ceramic composite material having a hot ceramic side and a cool metal side and a graded ceramic-metal zone therebetween, wherein the ceramic content of said composite ranges from 100% at said hot ceramic side to 0% at said cool metal side and the metal content of said composite ranges from 0% at said hot ceramic side to 100% at said cool metal side, and wherein said fiber reinforcement is graded by coefficient of thermal expansion from said hot ceramic side to said cool metal side to withstand a temperature differential of at or greater than 100° C. wherein said metal augments the load bearing capacity of said composite.

5. The fiber-reinforced metal-ceramic composite material of claim 4 wherein the fiber in the hot region has a lower coefficient of thermal expansion than the fiber in the cool region.

6. The fiber-reinforced metal-ceramic composite material of claim 4 wherein the fiber in the hot region has a higher coefficient of thermal expansion than the fiber in the cool region.

* * * * *